H. S. Bartholomew,
Bit Stock,
№ 65,046. Patented May 28, 1867.
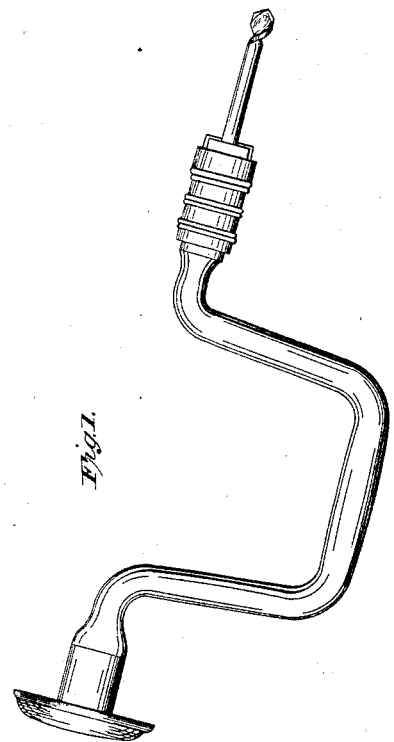
Fig. 1.
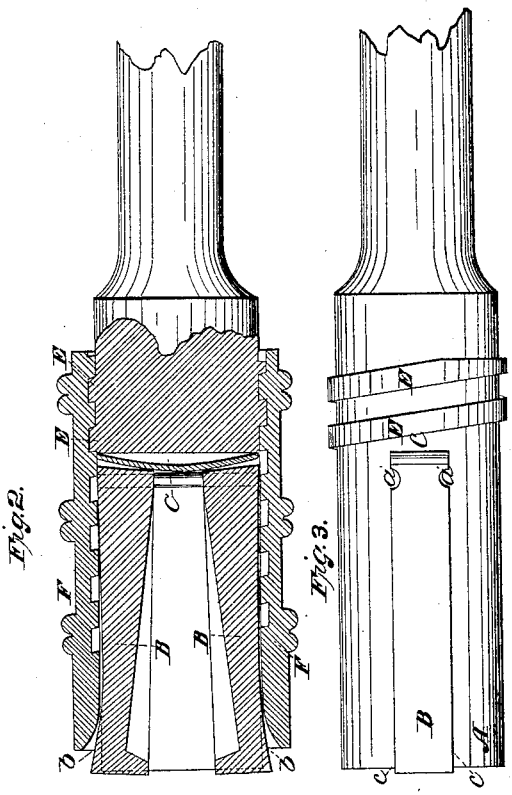
Fig. 2. Fig. 3.
Witnesses:
Thos. J. Knight
Jeremy W. Bliss
Inventor:
Harvey S. Bartholomew

United States Patent Office.

HARRY S. BARTHOLOMEW, OF BRISTOL, CONNECTICUT, ASSIGNOR TO HIMSELF AND G. W. BARTHOLOMEW, OF THE SAME PLACE.

Letters Patent No. 65,046, dated May 28, 1867.

IMPROVEMENT IN BRACES FOR BORING-BITS.

The Schedule referred to in these Letters Patent and making part of the same.

TO ALL WHOM IT MAY CONCERN:

Be it known that I, HARRY S. BARTHOLOMEW, of Bristol, county of Hartford, and State of Connecticut, have invented certain new and useful improvements in Bit-Stocks; and to enable others skilled in the art to make and use the same, I will proceed to describe, by referring to the drawings, in which the same letter indicate like parts in each of the figures.

The nature of this invention will be understood from the specification and drawings. It relates to the mode of construction of that portion of a bit-stock in which the bit is held true and firmly in its proper position without having bestowed any special pains in fitting the bit thereto. In the accompanying drawings—

Figure 1 is a bit-stock fashioned after this improvement.

Figure 2 is a section view of the same broken off from the brace.

Figure 3 is an outside view of the bit-holder having its fastening-sleeve removed therefrom, showing the edge of one of the jaws, and the dove-tail by which said jaws are held in place and rendered self-adjustable, and the position and location of the spring by which said jaws are actuated, and the screw-thread upon which the sleeve is arranged, so that by turning said sleeve thereon the jaws will be compressed or relaxed equally distant from the centre of the diameter of the holder or bit-opening.

In fig. 3 A is the end of a bit-stock in which the bit is secured for use, having a slit, $c$, cut through the centre thereof, in which the jaws are arranged to fit closely and work freely. Near the lower end and across the face surface of this slit $c$ are formed protuberances $a$, the office of which is to hold the jaws in their proper places. B are holding-jaws, in the lower or back end of which are formed depressions $a'$. Thus a dove-tail is formed upon the end of the jaws. C is an elliptic spring, or its equivalent, arranged in the base of the slit $c$, so that when the depression $a'$ is placed on to the protuberance $a$ and the jaw B in the slit $c$, said dove-tail formation will rest upon and be actuated by the spring C to keep the outer ends of said jaws diverging from each other. The inside face of these jaws is provided with angular depressions D, commencing just back of the front end and terminating at a point on the surface near the back end. $d$ are the griping-jaws or clamps formed in the outer end of the jaws B. The outside surface of these jaws is curved or concave shape, the object of which is to form a wedge, $b$, near the front end of the jaws, so that by turning said sleeve forward on to or over said wedge $b$, it (the sleeve) will compress the jaws firmly upon any tool placed between them. E is a screw-thread formed on the body of the stock just back of the slit $c$. F is a sleeve which is fitted closely and works freely upon said stock. This sleeve is provided with a screw-thread or depression to allow it to receive, or work upon, the screw-thread E.

Now, it will be readily seen that by inserting the shank of a bit into the depression D through the opening in the end of the stock, (in the usual way,) until the small end of the shank fills the diverging depression D, then, by turning the sleeve firmly on to or over the wedge or curved-shape jaws, they (the clamps $d$ in the end of said jaws) will gripe the square, round, or spindle portion of the bit close to its shank. Thus tools or bits of various sizes will be held true and firm, without the necessity of fitting the same thereto, as in the usual way.

I believe I have thus shown the nature, construction, and advantage of this invention, so as to enable others skilled to make and use the same therefrom.

I claim the protuberance $a$ upon the socket A, with a corresponding depression, $a'$, in the jaws, substantially as and for the purpose described.

HARRY S. BARTHOLOMEW. [L. S.]

Witnesses:
THOS. G. KNIGHT,
JEREMY W. BLISS.